Dec. 4, 1951 C. E. LOMAX 2,577,688
AUTOMATIC MEASURED SERVICE TELEPHONE SYSTEM
Filed Oct. 4, 1947
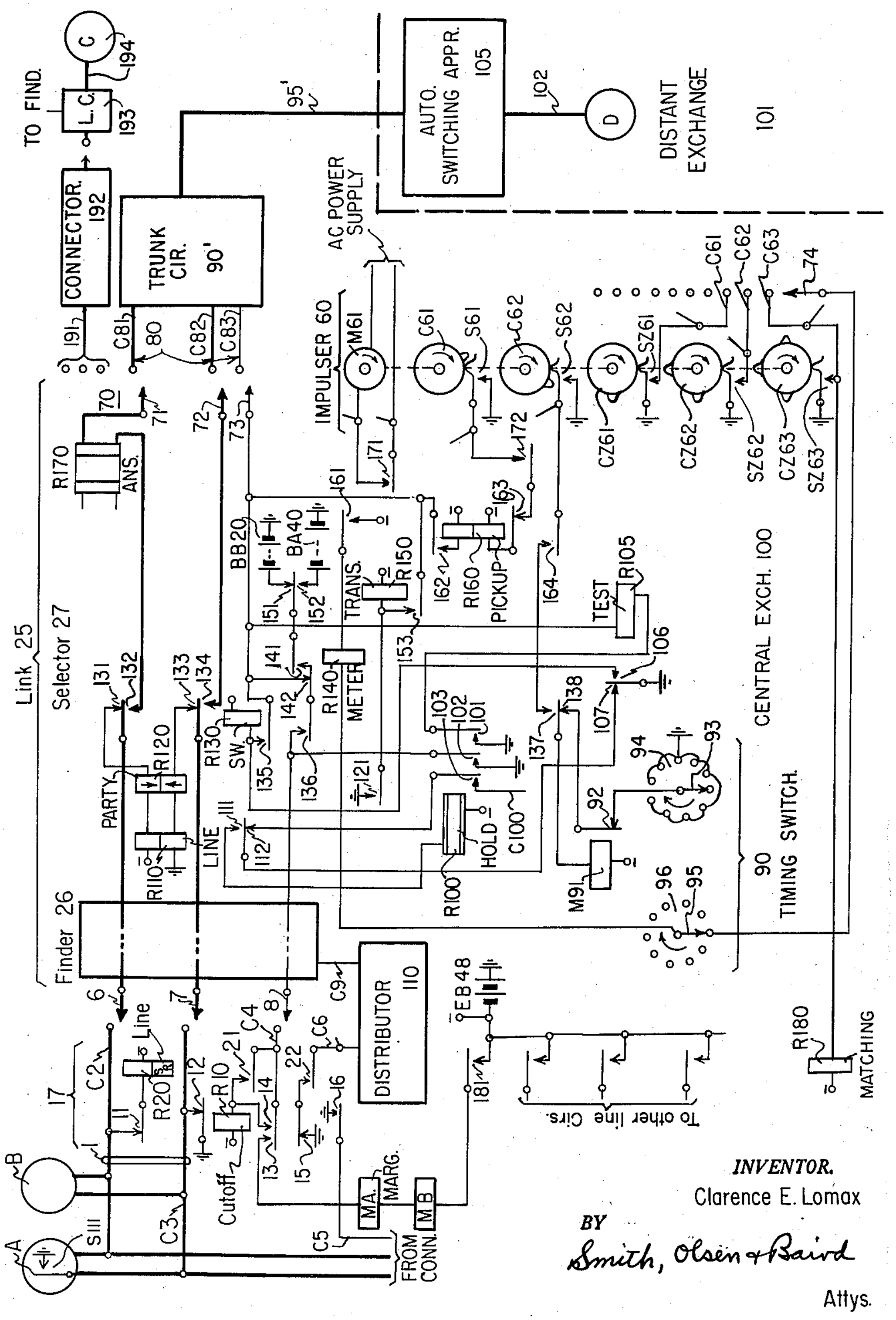
INVENTOR.
Clarence E. Lomax
BY
Smith, Olsen & Baird
Attys.

Patented Dec. 4, 1951 2,577,688

UNITED STATES PATENT OFFICE 2,577,688

AUTOMATIC MEASURED SERVICE TELEPHONE SYSTEM

Clarence E. Lomax, Chicago, Ill., assignor to Automatic Electric Laboratories, Inc., Chicago, Ill., a corporation of Delaware Application October 4, 1947, Serial No. 777,934

17 Claims. (Cl. 179—8.5)

The present invention relates to automatic telephone systems and more particularly to such systems embodying measured service facilities.

In a conventional telephone system of the type noted comprising party subscriber lines, the circuit arrangements that are employed to insure individual metering of the services rendered to each party subscriber substation on each party subscriber line are considerably complicated, rendering rather expensive the cooperating elements of the system.

Accordingly, it is a general object of the present invention to provide in an automatic measured service telephone system including party subscriber lines, an improved and simplified circuit arrangement for metering the service rendered to each party subscriber substation on each party subscriber line.

Another object of the invention is to provide in a telephone system of the type noted an improved metering arrangement, whereby the first meter individual to the first party subscriber substation on the party subscriber line reads directly the service rendered to the first party subscriber substation while the second meter individual to the second party subscriber substation on the party subscriber line reads the combined services rendered both to the first party subscriber substation and to the second party subscriber substation.

Another object of the invention is to provide in a telephone system of the type noted, an improved line circuit associated with each two-party subscriber line that includes two meters individual to the respective two party subscriber substations, wherein the magnet of one of the meters is of the marginal type permitting selective operation of the magnets mentioned over a single conductor employing high and low voltages.

A further object of the invention is to provide in an automatic measured service telephone system, an improved matching conductor arrangement for selectively operating the meters associated with subscriber lines involved in established connections.

A further object of the invention is to provide in an automatic measured service telephone system, improved switching links for extending the connections and for selectively operating the meters associated with the subscriber lines included in connections extended thereby.

A further object of the invention is to provide in a switching link of the character noted, an improved arrangement including a high voltage booster battery and a low voltage booster battery for selectively operating the meter individual to the calling subscriber substation connected to the subscriber line that is connected thereto.

A still further object of the invention is to provide in a switching link of the character noted, an improved timer arrangement for selectively operating the meter individual to the subscriber line that is connected thereto.

Further features of the invention pertain to the particular arrangement of the circuit elements of the system, whereby the above-outlined and additional operating features thereof are attained.

The invention, both as to its organization and method of operation, together with further objects and advantages thereof, will best be understood by reference to the following specification taken in connection with the accompanying drawing in which the single figure illustrates the details of an automatic telephone system having incorporated therein the features of the present invention.

Referring now more particularly to the drawing, there is illustrated an automatic telephone system comprising a central exchange 100 and a plurality of distant exchanges, including the distant exchange 101. The central exchange 100 is connected to each of the distant exchanges by a group of trunk lines extending therebetween, the central exchange 100 being connected to the distant exchange 101 by a group of trunk lines, including the trunk line 95'. The telephone system is divided into zones with reference to the central exchange 100; whereby the distant exchange 101 may reside in the second zone with respect to the central exchange 100; and other of the distant exchanges, not shown, may reside in first and third zones with respect to the central exchange 100. The central exchange 100 and each of the distant exchanges 101, etc., are of the automatic type, each serving a group of subscriber substations and being provided with automatic switching apparatus.

More particularly, the central exchange 100 serves party subscriber substations including the party subscriber substations A and B and private subscriber substations including the private subscriber substation C. The party subscriber substations A and B are arranged on a party subscriber line 1 provided with a line circuit 17 individual thereto; while the private subscriber substation C is arranged on a private subscriber line 194 provided with a line circuit 193 individual thereto. As previously noted, the central exchange 100 comprises automatic switching apparatus including a plurality of groups of finder-selector links and a corresponding plurality of groups of connectors. One of the groups of links includes the link 25 illustrated consisting of the finder 26 and the selector 27. Further, each group of links is provided with a distributor, the distributor 110 being individually associated with the group of links, including the link 25. The finders 26, etc., of the group of links, including the link 25, have access to the group of subscriber lines including the party subscriber line 1; while the group of connectors, including the connector 192, has access to the group of subscriber lines, including the private subscriber line 194. Also the selectors 27, etc., of the group of links, including the link 25, have access to the different groups of connectors and to the different groups of trunk lines. Specifically, the selector 27 has access to the connector 192 via a trunk 191 extending thereto and to a trunk 80 terminated by a trunk circuit 90′ that, in turn, terminates one end of the trunk line 95′. The other end of the trunk line 95′ is terminated in the automatic switching apparatus 105 previously mentioned disposed in the distant exchange 101.

As previously noted, the distant exchange 101 serves a plurality of private subscriber substations, including the private subscriber substation D, and a plurality of party subscriber substations, not shown. The private subscriber substation D is arranged on the private subscriber line 102, is provided with a line circuit, not shown, and is accessible to and has access to the automatic switching apparatus 105. The apparatus arranged in the distant exchange 101 may be entirely conventional, the automatic switching apparatus 105 preferably being of the Strowger type.

In the central exchange 100 each of the private subscriber substations C, etc., and each of the party subscriber substations A, B, etc., is provided with conventional subscriber substation apparatus. Also each first party subscriber substation A, etc., on each party subscriber line 1, etc., is provided with a dial having a set of off-normal springs that is operated each time the associated dial is operated to transmit a digit in order to ground the positive line conductors of the associated party subscriber line for a purpose more fully explained hereinafter. Preferably, the line circuit individually associated with each party subscriber line is identical to the line circuit 17 individually associated with the party subscriber line 1; which line circuit 17 comprises a line relay R20, a cut-off relay R10 and two meters MA and MB respectively individual to the two party subscriber substations A and B connected to the party subscriber line 1. Also the line circuit 17 is operatively associated with the distributor 110.

The finder 26 of the link 25 may be of the conventional Strowger type; while the selector 27 of the link 25 embodies a conventional Strowger mechanism 70, a timing switch 90, and a relay group, shown in skeleton outline and including a line relay R110, a party relay R120, a switching relay R130, a meter relay R140, a transfer relay R150, a pick-up relay R160, an answer relay R170, a hold relay R100, a test relay R105 and a magnet transfer relay, not shown. The Strowger mechanism 70 is of conventional construction and arrangement including a vertical wiper 74 provided with an associated vertical contact bank and three ordinary wipers 71, 72 and 73 provided with an ordinary contact bank, a vertical magnet, not shown, for driving the wiper carriage step by step in the vertical direction away from its normal vertical position, a rotary magnet, not shown, for driving the wiper carriage step by step in the rotary direction away from its normal rotary position, and a release magnet, not shown, for releasing the wiper carriage and for causing it to be returned to its normal rotary and vertical positions. Also one or more sets of switch springs, not shown, are associated with the wiper carriage of the Strowger mechanism 70 and are operated when the wiper carriage is driven one step in the vertical direction away from its normal vertical position. The timing switch 90 is of the rotary type comprising two individual wipers 93 and 95 provided with associated contact banks and a rotary magnet M91 for driving the wipers noted step by step in the clockwise direction. Also the link 25 comprises an ordinary 48 volts exchange battery indicated at EB48, a 40 volts booster battery indicated at BA40, and a 20 volts booster battery indicated at BB20.

Also in the central exchange 100 an impulser 60 is commonly associated with the links 25, etc., and comprises a motor M61 of the constant speed variety adapted to be operated from a commercial source of A. C. power indicated, a matching relay R180 and an operating shaft carrying five cams C61, C62, CZ61, CZ62 and CZ63. The cams C61 and C62 are employed for common control purposes; whereas the cams CZ61, CZ62 and CZ63 are employed for zone metering purposes and respectively constitutes the zone metering cams for the first, second and third zones of the telephone system. Specifically, the three zone cams CZ61, CZ62 and CZ63 are provided with respectively associated zone switches SZ61, SZ62 and SZ63 respectively terminating the zone conductors C61, C62 and C63; which zone conductors C61, C62 and C63 are respectively terminated in the third, second and first contacts in the vertical contact bank associated with the vertical wiper 74 of the Strowger mechanism 70 and are utilized for a purpose more fully explained hereinafter.

The trunk circuits 90′, etc., may be of any suitable type; the connectors 192, etc., are preferably of the Strowger type; and the line circuit 193, etc., individually associated with the private subscriber lines 194, etc., are of any suitable type including a meter.

A better understanding of the connection and arrangement of the apparatus incorporated in the telephone system will be facilitated from a consideration of the extension of various calls from the central exchange 100.

Considering now the extension of a local call in the central exchange 100 from a calling second party subscriber substation, such for example, as the second party subscriber substation B to a called private subscriber substation, such for example, as the private subscriber substation C, the subscriber at the calling second party subscriber substation B first initiates a call, thereby to complete a loop circuit, including the contacts 11 and 12 and the line conductors C2 and C3 of the subscriber line 1, for energizing the winding of the line relay R20 in the line circuit 17 individually associated with the party subscriber line 1. When the winding of the line relay R20 is thus energized it operates to complete, at the contacts 21, a path for applying battery potential by way of the winding of the cut-off relay R10 to the control conductor C4 of the party subscriber line 1; and to complete, at the contacts 22, a path, including the contacts 15, for applying ground potential to the start conductor C6 extending to the distributor 110. Assuming that the distributor 110 has selected the link 25 illustrated via the conductor C9 at this time, operation of the finder 26 of the link 25 is initiated; whereby the finder 26 operates to find the calling party subscriber line 1; whereupon ground potential in the finder 26 is applied to the control wiper 8 thereof and consequently to the control conductor C4 of the calling subscriber line 1 completing a circuit substantially identical to that previously traced for operating the cut-off relay R10. Upon operating the cut-off relay R10 completes, at the contacts 14, a point in multiple to the contacts 21 in a holding circuit for energizing the winding thereof; prepares, at the contacts 13, a circuit traced hereinafter for operating the magnet MB of the associated meter; and completes, at the contacts 16, a path for applying ground potential to the control conductor C5 of the party subscriber line 1 in order to mark the party subscriber line 1 as busy to the connectors having access thereto. Also the cut-off relay R10 interrupts, at the contacts 15, the path for applying ground potential to the start conductor C6 extending to the distributor 110; and interrupts, at the contacts 11 and 12, the loop circuit for energizing the winding of the line relay R20; whereby the latter relay, being of the slow-to-release type, restores shortly thereafter. Also at this time, a loop circuit is completed from the calling party subscriber substation B, via the line conductors C2 and C3 of the party subscriber line 1, the line wipers 6 and 7 of the finder 26 and the contacts 131, 133, for energizing in series the upper and lower windings of the party relay R120 and the line relay R110 in the selector 27. When this loop circuit is completed, the line relay R110 operates; however, the party relay R120 does not operate as it is of the differential type. Upon operating the line relay R110 completes, at the contacts 111, a circuit, including the contacts 107, for operating the hold relay R100. Upon operating the hold relay R100 prepares, at the contacts 103, a dialing path to the dial conductor C100; prepares, at the contacts 101, a circuit traced hereinafter for the test relay R105; and completes, at the contacts 102, a path for applying ground potential to the control wiper 8 of the finder 26 in order to retain operated the cut-off relay R10 in the line circuit 17 and the finder 26. Also at this time the magnet transfer relay, not shown, is operated and the left-hand winding of the answer relay R170 is energized over a circuit, not shown, in order to pole the latter relay for subsequent operation as explained more fully hereinafter.

At this time the subscriber at the calling party subscriber substation B dials the three digits comprising the directory number of the called private subscriber substation C. The line relay R110 follows the impulses of the first digit repeating, at the contacts 112, the impulses thereof over a path, including the contacts 107 and 103 and the dial conductor C100; whereby the vertical magnet, not shown, of the Strowger mechanism 70 is operated in accordance with the first digit. Also each time the line relay R110 restores and then reoperates, it interrupts, and then recompletes, at the contacts 111, the previously traced circuit for energizing the winding of the hold relay R100; whereby the latter relay is retained in its operated position during impulsing as it is of the slow-to-release type. At the conclusion of the first digit, the line relay R110 is retained in its operated position, and shortly thereafter the magnet transfer relay, not shown, restores in order to effect intermittent operation of the rotary magnet, not shown, of the Strowger mechanism 70. More particularly, at this time the Strowger mechanism 70 has responded to the first digit of the directory number and has selected the group of trunks including the trunk 191 and operation thereof is initiated to search for an idle trunk in the selected group. Assuming that the trunk 191 extending to the connector 192 is the first idle trunk in the group mentioned when it is selected by the wiper set of the Strowger mechanism 70 battery potential on the control conductor thereof is applied to the control wiper 73 of the Strowger mechanism 70 completing a circuit, including the contacts 101, for operating the test relay R105. Upon operating the test relay R105 interrupts, at the contacts 107, the previously traced circuit for energizing the winding of the hold relay R100 in order to cause the latter relay to restore shortly thereafter, it being of the slow-to-release type. Also the test relay R105 completes, at the contacts 106, a circuit for operating the switching relay R130; and also arrests operation of the rotary magnet, not shown, of the Strowger mechanism 70. Upon operating the switching relay R130 completes, at the contacts 135 and 136, a holding circuit, also including the contacts 102, for energizing the winding thereof and a multiple path for applying ground potential to the control wiper 73 of the Strowger mechanism 70. Further the switching relay R130 interrupts, at the contacts 131 and 133, the loop circuit extending between the calling party subscriber substation B and the party relay R120 and the line relay R110; and completes, at the contacts 132 and 134, an extension of the loop circuit via the right-hand winding of the answer relay R170 to the line wipers 71 and 72 of the Strowger mechanism 70 and thence via the line conductor of the trunk 191 to the line relay in the connector 192. At this time the connector 192 is conditioned to be responsive to the second and third digits dialed at the calling party subscriber substation B; and operates to return ground potential over the control conductor thereof and consequently to the control wiper 73 of the Strowger mechanism 70. This application of ground potential to the control wiper 73 of the Strowger mechanism 70 completes a multiple holding circuit, including the contacts 135 for energizing the winding of the switching relay R130; and completes a multiple path, including the contacts 142 and 136 for applying ground potential to the control wiper 8 of the finder 26 in order to retain operated the cut-off relay R10 in the line circuit 17 and the finder 26. At this time the line relay R110 restores interrupting, at the contacts 111, a further point in the circuit for retaining operated the hold relay R100. When the hold relay R100 restores, it interrupts, at the contacts 101, the circuit for retaining operated the test relay R105 in order to cause the latter relay to restore; interrupts, at the contacts 102, the original holding circuit for retaining operated the switching relay R130 and for applying ground potential to the control wiper 73 of the Strowger mechanism 70; and interrupts, at the contacts 103, a further point in the dialing circuit including the dial conductor C100. At this time the selector 27 has responded to the first digit of the directory number dialed at the calling party subscriber substation B and has operated to select the trunk 191 extending to the connector 192; whereby only the switching relay R130 in the selector 27 is retained in its operated position. The answer relay R170 is not operated notwithstanding the completed loop circuit via the right-hand winding thereof as it is not poled to operate; however, a circuit, not shown, is completed for energizing the left-hand winding of the answer relay R170, as previously noted.

The second and third digits of the directory number dialed at the calling party subscriber substation B are transmitted over the loop circuit extending therefrom via the party subscriber line 1, the finder 26, the selector 27, the trunk 191 to the connector 192; whereby the connector 192 responds to the two digits mentioned in order to select the subscriber line 195 extending to the called private subscriber substation C. Further operation of the connector 192 depends upon the idle or busy condition of the called private subscriber substation C at this time as determined by markings in the associated line circuit 193; all in accordance with conventional practice. Assuming that the called private subscriber substation C is idle at this time, the connector 192 operates to project ringing current over the private subscriber line 194 extending thereto and to return ring-back tone current over the previously traced loop circuit extending back to the calling party subscriber substation B.

When the subscriber at the called private subscriber substation C answers the call, the connector 192 operates to arrest the projection of ringing current thereto, as well as the return of ring-back tone current over the loop circuit extending to the calling party subscriber substation B. Also the connector 192 completes an operative connection between the loop circuit extending thereto from the calling party subscriber substation B and the loop circuit extending therefrom to the called private subscriber substation C; and reverses the polarity of the loop circuit extending back to the calling party subscriber substation B; whereby the right-hand winding of the answer relay R170 in the selector 27 is poled to operate. Upon operating the answer relay R170 completes, at the contacts 171, a multiple point in the circuit for operating the motor M61 of the impulser 60; whereby operation of the motor M61 is initiated at this time unless, of course, it is already operating. The operating motor M61 of the impulser 60 rotates the cams C61, etc., previously noted and when the cam C61 next closes the set of switch springs S61, a circuit, including the contacts 172 and 163, is completed for energizing the lower winding of the pick-up relay R160 in the selector 27. When the lower winding of the pick-up relay R160 is thus energized, the latter relay operates to complete, at the contacts 162, a holding circuit, including the grounded control wiper 73 of the Strowger mechanism 70, for energizing the upper winder thereof. Also the pick-up relay R160 prepares, at the contacts 161, a circuit traced hereinafter for operating the meter relay R140; and prepares, at the contacts 164, a circuit traced hereinafter for operating the rotary magnet M91 of the timing switch 90. Subsequently when the cam C62 closes the set of switch springs S62, the previously mentioned circuit, including the contacts 164 and 137, is completed for operating the rotary magnet M91 of the timing switch 90. Later when the cam C62 opens the set of switch springs S62, the circuit for operating the rotary magnet M91 is interrupted; whereupon the rotary magnet M91 restores in order to drive the wipers 93 and 95 of the timing switch 90 one step in the clockwise direction away from their home positions. As the motor M61 of the impulser 60 continues to operate, the circuit for operating the rotary magnet M91 of the timing switch 90 is completed and then interrupted intermittently; whereby the wipers noted of the timing switch 90 are driven step by step in the clockwise direction. Preferably, the motor M61 of the impulser 60 is of the constant speed variety as previously noted and rotates the shaft upon which the cams C61, etc., are mounted precisely one revolution in ten seconds. Accordingly, the rotary magnet M91 of the timing switch 90 is operated and restored each ten seconds; whereby the wipers noted of the timing switch 90 operate through one complete revolution in 100 seconds since each of the wipers noted is provided with ten contacts in the associated contact banks. Accordingly, it will be understood that when the call is answered, the answer relay R170 in the selector 27 initiates operation of the impulser 60; which impulser 60 may occupy any rotary position; whereby within ten seconds operation of the timing switch 90 is initiated. After operation of the timing switch 90 is initiated it completes a timing operation every 100 seconds constituting a base time interval.

When the pick-up relay R160 operates, it prepares, at the contacts 161, the previously mentioned circuit for operating the meter relay R140; which circuit includes the wiper 95 of the timing switch 90 and the engaged home contact in the associated contact bank, as well as the vertical wiper 74 of the Strowger mechanism 70. Accordingly, the meter relay R140 is operated shortly following operation of the pick-up relay R160, while the wiper 95 of the timing switch 90 occupies its home position, provided the vertical wiper 74 of the Strowger mechanism 70 has engaged a contact in the associated contact bank terminating one of the zone conductors C61, C62, or C63, since the cams CZ61, CZ62 and CZ63 operate shortly following operation of the pick-up relay R160 to apply ground potential to the respective zone conductors C61, C62 and C63. In the present example the vertical wiper 74 of the Strowger mechanism 70 does not engage one of the contacts in the associated vertical contact bank terminating the three zone conductors C61, C62 and C63 since the present call is a local call; accordingly, ground potential is not applied periodically to the vertical wiper 74 of the Strowger mechanism 70 and the meter relay R140 is not operated periodically. In fact, the present local call is not timed; the meter relay R140 is not operated; and accordingly the magnet MB associated with the meter in the line circuit 17 individual to the party subscriber substation B is not operated.

The present local call is maintained during the convenience of the subscribers at the calling party subscriber substation B and at the called private subscriber substation C; and at the conclusion thereof, when the subscriber at the called private subscriber substation C disconnects the connector 192 operates in order again to reverse the polarity of the loop circuit extending back to the calling party subscriber substation B; whereby the answer relay R170 in the selector 27 is poled to restore. Upon restoring the answer relay R170 interrupts, at the contacts 171, the multiple point in the circuit for operating the motor M61 of the impulser 60; whereby operation of the impulser 60 is arrested at this time unless it is retained operated by another of the links. Subsequently, when the subscriber at the calling party subscriber substation B disconnects, the loop circuit extending to the connector 192 is interrupted in order to bring about the release of the connector 192; whereupon ground potential is removed from the control conductor of the trunk 191 and consequently from the control wiper 73 of the Strowger mechanism 70. When ground potential is thus removed from the control wiper 73 of the Strowger mechanism 70, the holding circuit for energizing the upper winding of the pick-up relay R160, the multiple holding circuit for energizing the winding of the switching relay R130 and the holding circuit for energizing the winding of the cut-off relay R10 are interrupted causing the relays mentioned to restore. Also the removal of ground potential from the control wiper 8 of the finder 26 brings about the release thereof. Further, when the switching relay R130 restores, a circuit is completed for operating the release magnet, not shown, of the Strowger mechanism 70; whereby the Strowger mechanism 70 is released and returned to its normal rotary and vertical positions. Also upon restoring the switching relay R130 completes, at the contacts 138, a circuit, including the contacts 92, the wiper 93 of the timing switch 90 and the engaged contact in the associated contact bank included in the grounded multiple for operating the rotary magnet M91. Upon operating the rotary magnet M91 interrupts, at the contacts 92, the operating circuit therefor; whereby it restores to drive the wipers noted of the timing switch 90 an additional step in the clockwise direction; and to recomplete, at the contacts 92, the operating circuit therefor. Accordingly, the rotary magnet M91 operates buzzer fashion to drive the wipers noted of the timing switch 90 step by step in the clockwise direction back into their home positions; whereupon the wiper 93 of the timing switch 90 engages the home contact in the associated contact bank that is not included in the grounded multiple mentioned, thus arresting further operation of the rotary magnet M91. At this time the link 25 is completely released and is marked via the conductor C9 as idle to the distributor 110 so that it may be again assigned for use thereby.

When the cut-off relay R10 in the line circuit 17 restores, it interrupts, at the contacts 16, the path for applying ground potential to the control conductor C5 of the party subscriber line 1; whereby the party subscriber line 1 is marked as idle to the connectors having access thereto. Of course, while the connector 192 engages the private subscriber line 194, the private subscriber line 194 is marked by the associated line circuit 193 as busy to the other connectors in the associated group having access thereto; and when the connector 192 is released the private subscriber line 194 is marked by the associated line circuit 193 as idle to the other connectors in the associated group having access thereto. At this time the established connection between the calling party subscriber substation B and the called private subscriber substation C is released and all of the apparatus involved therein is completely released and available for further use.

In view of the foregoing it will be understood that a local call may be extended from the calling first party subscriber substation A on the party subscriber line 1 to a called private subscriber substation, such for example, as the private subscriber substation C in an identical manner. In this case it is noted that each time the subscriber at the calling first party subscriber substation A dials a digit of the directory number of the called private subscriber substation C that the set of switch springs S111 in the associated dial is operated and remains operated until the finger wheel of the dial is returned to its normal position at the conclusion of the transmission of the digit by the dial; whereby ground potential at the calling first party subscriber substation A is applied to the positive line conductor C3 of the party subscriber line 1 during the dialing of each digit thereat. This application of ground potential at the set of switch springs S111 in the dial at the calling first party subscriber substation A to the positive line conductor C3 of the party subscriber line 1 completes a path, including the line wiper 7 of the finder 26 and the contacts 133, for short-circuiting in series the lower windings of the party relay R120 and the line relay R110 in the selector 27; whereby the party relay R120 operates, it being of the differential type, incident to the dialing of the first digit of the directory number of the called private subscriber substation C at the calling first party subscriber substation A; whereas the line relay R110 follows the impulses of the first digit dialed at the calling first party subscriber substation A in the manner previously explained. Upon operating the party relay R120 completes, at the contacts 121, a circuit for operating the transfer relay R150; whereby the latter relay completes, at the contacts 153, a holding circuit for energizing the winding thereof in series with the winding of the test relay R105 via the contacts 101. When this holding circuit is completed the transfer relay R150 is retained in its operated position; however the test relay R105 is not operated. Subsequently, when the selector 27 selects the trunk 191 extending to the idle connector 192 and the connector 192 is seized returning ground potential via the control conductor of the trunk 191 to the control wiper 73 of the Strowger mechanism 70, a multiple holding circuit is completed for energizing the winding of the transfer relay R150. Upon operating the transfer relay R150 interrupts, at the contacts 151, a further point in a metering circuit, including the booster battery BB20; and prepares, at the contacts 152, a further point in a metering circuit, including the booster battery BA40; however the booster battery circuit mentioned is not completed at this time since the meter relay R140 is not operated during the present local call. Accordingly, the operation of the transfer relay R150 to select the booster battery BA40 instead of the booster battery BB20 is without effect in the present example as the meter MA in the line circuit 17 individually associated with the first party subscriber substation A is not operated incident to the completion of local calls as previously noted. The subsequent completion of the established connection between the calling first party subscriber substation A and the called private subscriber substation C, as well as the ultimate release thereof, are the same as previously explained. Specifically, when the connector 192 is ultimately released, ground potential is removed from the control conductor of the trunk 191 and consequently from the control wiper 73 of the Strowger mechanism 70 interrupting the holding circuit for retaining operated the transfer relay R150, the pick-up relay R160 and the switching relay R130, as well as finder 26 and the cut-off relay R10 in the line circuit 17; all in the manner previously explained.

Considering now the extension of a trunk call from a calling second party subscriber substation, such for example, as the second party subscriber substation B in the central exchange 100 to a called private subscriber substation, such for example, as the private subscriber substation D in the distant exchange 101, the subscriber at the calling second party subscriber substation B first initiates the call, dials the prefix digit 2 designating the distant exchange 101 included in the second zone of the telephone system, and then dials the three digits comprising the directory number of the called private subscriber substation D in the distant exchange 101. When the call is initiated at the calling party subscriber substation B, the line circuit 17 individual to the party subscriber line 1 is controlled in order to govern the distributor 110; whereby the link 25 illustrated may be assigned; whereupon the finder 26 operates to find the party subscriber line 1; all in the manner previously explained. When the subscriber at the calling party subscriber substation B dials the prefix digit 2, the Strowger mechanism 70 in the selector 27 is operated in accordance therewith in order to select the group of trunks, including the trunk 80, and to position the vertical wiper 74 upon the contacts in the associated vertical contact bank terminating the second zone conductor C62 extending to the set of switch springs SZ62 governed by the zone cam CZ62. At the conclusion of the prefix digit 2, the Strowger mechanism 70 operates to select an idle trunk in the group, including the trunk 80; whereby the switching relay R130 is operated as previously explained. Assuming that the trunk 80 is the first idle trunk in the group mentioned when the Strowger mechanism 70 operates to seize the trunk 80, the trunk circuit 90′ is seized and the switching relay R130 is operated in order to switch through the selector 27. The trunk circuit 90′ seizes the automatic switching apparatus 105 in the distant exchange 101 over the trunk line 95′ extending between the central exchange 100 and the distant exchange 101. At this time a direct loop circuit is completed between the calling party subscriber substation B in the central exchange 100 and the trunk circuit 90′ via the party subscriber line 1, the finder 26, the selector 27 and the trunk 80. Accordingly, when the subscriber at the calling party subscriber substation B dials the three digits comprising the directory number of the called private subscriber substation D in the distant exchange 101, the trunk circuit 90′ responds thereto repeating the three digits mentioned over the trunk line 95′ to the automatic switching apparatus 105 in the distant exchange 101; whereby the automatic switching apparatus 105 operates to select the private subscriber line 102 extending to the called private subscriber substation D.

The subsequent operation of the automatic switching apparatus 105 depends upon the idle or busy condition of the private subscriber substation D at this time as marked thereto by the line circuit, not shown, associated with the private subscriber line 102; all in accordance with conventional practice. In the event the called private subscriber substation D is busy at this time the automatic switching apparatus 105 operates to return busy tone current over the trunk line 95′; whereby the trunk circuit 90 repeats the busy tone current over the connection to the calling party subscriber substation B indicating to the subscriber thereat that the desired connection may not be had immediately by virtue of the busy condition of the called private subscriber substation D in the distant exchange 101 at this time. On the other hand, in the event the called private subscriber substation D is idle at this time, the automatic switching apparatus 105 operates to project ringing current over the private subscriber line 102 extending thereto and to return ring-back tone current over the trunk line 95′; which ring-back tone current is repeated by the trunk circuit 900 over the connection to the calling party subscriber substation B.

Assuming that the called private subscriber substation D is idle at this time, when the subscriber thereat answers the call, the automatic switching apparatus 105 is controlled in order to govern over the trunk line 95′ the trunk circuit 90′; whereby the polarity of the loop circuit extending betwen the trunk circuit 90′ and the calling party subscriber substation B is reversed effecting the operation of the answer relay R170 in the selector 27. Upon operating the answer relay R170 initiates operation of the impulser 60 in the event the impulser 60 is not operating at this time. Subsequently, the cam C51 effects operation of the pick-up relay R160; whereby the latter relay prepares, at the contacts 161, the circuit for operating the meter relay R140; which circuit includes the wiper 95 of the timing switch 90 and the engaged home contacts in the associated contact bank, as well as the vertical wiper 74 of the Strowger mechanism 70 and the engaged second contact in the associated contact bank. Subsequently, the second zone cam CZ62 closes and then opens the associated set of switch springs SZ62 applying ground potential to and then removing ground potential from the second zone conductor C62; whereby a circuit substantially identical to that previously traced is completed and then interrupted for operating the meter relay R140; whereby the latter relay operates and restores. In fact, the second zone cam CZ62 comprises two projections; whereby the associated set of switch springs SZ62 are closed and then opened twice in succession in order to effect operation and then restoration of the meter relay R140 twice in succession as explained above. Upon operating the meter relay R140 interrupts, at the contacts 142, the normal connection, including the contacts 136 between the control wiper 73 of the Strowger mechanism 70 and the control wiper 8 of the finder 26; and recompletes, at the contacts 141, a connection, including the contacts 151 and 136 between the booster battery BB20 and the control wiper 8 of the finder 26. Subsequently, when the meter relay R140 restores, it interrupts, at the contacts 141, the path for connecting the booster battery BB20 to the control wiper 8 of the finder 26; and recompletes, at the contacts 142, the normal connection, including the contacts 136, between the control wiper 8 of the finder 26 and the control wiper 73 of the Strowger mechanism 70. When the booster battery BB20 is connected via the above traced path to the control wiper 8 of the finder 26; current therefrom energizes the winding of the switching relay in the finder 26 retaining the finder 26 in its operated position, current therefrom energizes the winding of the cut-off relay R10 in the line circuit 7 retaining the cut-off relay R10 in its operated position and potential therefrom is extended via the conductor C4 of the party subscriber line 1 and the contacts 13 to the magnets MA and MB of the two meters in the line circuit 17 respectively associated with the party subscriber substations A and B. Also each time the second zone cam CZ62 operates to close the associated switch springs SZ62, the third zone cam CZ63 operates to close the associated set of switch springs SZ63. Each time the third zone cam CZ63 closes and then opens the associated set of switch springs SZ63, a direct circuit is completed and then interrupted for operating the matching relay R180 and a multiple path is completed and then interrupted for applying ground potential to the third zone conductor C63. Accordingly, the matching relay R180 is operated each time the meter relay R140 is operated; whereby the matching relay R180 completes, at the contacts 181, a path for connecting the exchange battery EB48 to the magnets MB and MA of the two meters in the line circuit 17 respectively associated with the party subscriber substations B and A. In the present example, the booster battery BB20 is connected through the circuit traced above to the exchange battery EB48; whereby the two magnets MA and MB are energized in series circuit relation from the booster battery BB20 and the exchange battery EB48. Since the magnet MA of the meter in the line circuit 17 individual to the party subscriber substation A is of the marginal type, it does not operate; however, the magnet MB of the meter in the line circuit 17 individual to the party subscriber substation B does operate. Accordingly, at this time the meter MA in the line circuit 17 individually associated with the party subscriber substation A is not operated; whereas the meter MB in the line circuit 17 individually associated with the party subscriber substation B is operated. Specifically, the second zone cam CZ62 effects two successive applications of ground potential to the second zone conductor C62, while the wiper 95 of the timing switch 90 occupies its home position; whereby the meter relay R140 is operated and restored twice in succession to bring about two successive operations of the magnet MB of the meter in the line circuit 17 individual to the party subscriber line B. Also each time the meter relay R140 operates, it interrupts, at the contacts 142, the connection to the control wiper 73 of the Strowger mechanism 70 as previously noted, thereby to prevent current from the booster battery BB20 from feeding via the control wiper 73 of the Strowger mechanism 70 and the control conductor C83 of the trunk 80 into the winding or windings of the relay or relays in the trunk circuit 90' connected to the control conductor C83 of the trunk 80; thereby to prevent excessive and useless current from being supplied from the booster battery BB20.

After the magnet MB has been operated twice in succession under the control of the meter relay R140 in the manner explained above, the control cam C62 of the impulser 60 closes the associated set of switch springs S62 in order to effect operation of the rotary magnet M91 of the timing switch 90. Subsequently, the control cam C62 opens the set of switch springs S62; whereby the rotary magnet M91 restores in order to drive the wipers noted of the timing switch 90 one step in the clockwise direction away from their home positions. At this time the wiper 95 of the timing switch 90 disengages the home contact in the associated contact bank in order to prevent operation of the meter relay R140 under the control of the impulser 60; however, continued intermittent operation of the timing switch 90 takes place. After the expiration of 100 seconds subsequent to operation of the pick-up relay R160 ten ground impulses have been transmitted from the set of switch springs S62 governed by the control cam C62 to the rotary magnet M91; whereby the wipers noted of the timing switch 90 are driven back into their home positions, assuming that the established connection prevails throughout this time interval mentioned. Thereafter, while the wiper 95 of the timing switch 90 engages the home contact in the associated contact bank, the second zone cam CZ62 operates to apply two additional ground impulses to the second zone conductor C62 simultaneously with operation of the third zone cam CZ63 to effect operation of the matching relay R180; whereby the meter relay R140 is again operated and restored twice in succession to bring about two additional operations of the magnet MB associated with the meter in the line circuit 17 individual to the party subscriber substation B.

In view of the foregoing, it will be understood when the present trunk is extended from the calling party subscriber substation B in the central exchange 100 to the called private subscriber substation D in the distant exchange 101 and subsequently answered by the subscriber at the called private subscriber substation D, that the answer relay R170 in the selector 27 is operated in order to cause operation shortly thereafter of the meter relay R140 in the selector 27 twice in succession under the control of the impulser 60; the meter relay R140 in the selector 27 being operated twice in succession by virtue of the fact that the present trunk call extended to the distant exchange 101 resides in the second zone of the telephone system with respect to the central exchange 100; whereby the meter MB in the line circuit 17 individually associated with the calling party subscriber substation B is operated twice in succession in order to register two call units. Thereafter should the established connection be maintained for an additional time interval of 100 seconds, the impulser 60 again operates twice in succession, the meter relay R140 in the selector 27 as previously explained; whereby the meter MB in the line circuit 17 individually associated with the party subscriber substation B is again operated twice in succession in order to register two additional call units. Of course, in the event the established connection prevails for an extended time interval the impulser 60 continues to govern the meter relay R140 in the selector 27 at the expiration of each 100 seconds; whereby the meter MB in the line circuit 17 individually associated with the party subscriber substation B is operated two additional times to register two additional call units at the expiration of each additional 100 seconds.

At the conclusion of the established connection when the subscriber at the called private subscriber substation D in the distant exchange 101 disconnects the automatic switching apparatus 105 governs over the trunk line 95' the trunk circuit 90; whereby the polarity of the loop circuit extending between the calling party subscriber substation B and the trunk circuit 90' is reversed in order to pole the answer relay R170 to restore. Upon restoring the answer relay R170 interrupts, at the contacts 171, the multiple circuit for operating the motor M61 of the impulse sender 60. Subsequently, when the subscriber at the calling party subscriber substation B disconnects, the loop circuit extending therefrom to the trunk circuit 90' is interrupted; whereby the trunk circuit 90' is released effecting the release over the trunk line 95' of the automatic switching apparatus 105 and interrupting the return of ground potential over the control conductor C83 of the trunk 80. The automatic switching apparatus 105 is then released; whereby the subscriber line 102 extending to the private subscriber substation D is marked as idle thereto. When ground potential is removed from the control conductor C83 of the trunk 80 and consequently from the control wiper 73 of the Strowger mechanism 70, the selector 27 and the finder 26 are released in the manner previously explained. Also the cut-off relay R10 in the line circuit 17 associated with the party subscriber line 1 is restored marking the party subscriber line 1 as idle to the connectors having access thereto.

In view of the foregoing description of the extension of a connection from the calling party subscriber substation B in the central exchange 100 to the called private subscriber substation D in the distant exchange 101 residing in the second zone of the telephone system, it will be understood that trunk calls from the calling party subscriber substation B in the central exchange 100 to subscriber substations in exchanges residing in the first and third zones of the telephone system may be completed in an identical manner. Of course, trunk calls are routed to exchanges respectively disposed in the first and third zones of the telephone system in response to the prefix digits 3 and 1; whereby the vertical wiper 74 of the Strowger mechanism 70 engages the respective third and first contacts in the associated vertical contact bank respectively terminating the first and third zone conductors C61 and C63 extending to the impulser 60. Accordingly, when a trunk call is completed to a distant exchange disposed in the first zone of the telephone system, the vertical wiper 74 of the Strowger mechanism engages the third contact in the associated vertical contact bank terminating the first zone conductor C61; whereby the first zone cam CZ61 of the impulser 60 transmits one ground impulse each ten seconds thereover bringing about one initial operation of the meter relay R140 in the selector 27 and an additional operation thereof every 100 seconds or base time interval; all in the manner previously explained. Similarly, when a trunk call is completed to a distant exchange disposed in the third zone of the telephone system, the vertical wiper 74 of the Strowger mechanism 70 engages the first contact in the associated vertical contact bank terminating the third zone conductor C63; whereby the third zone cam CZ63 of the impulser 60 transmits three ground impulses each ten seconds thereover bringing about three initial operations of the meter relay R140 in the selector 27 and an additional three operations thereof every 100 seconds or base time interval; all in the manner previously explained.

In view of the foregoing it will be understood that the extension of a trunk call from a calling first party subscriber substation, such for example, as the first party subscriber substation A in the central exchange 100 to a called private subscriber substation, such for example, as the private subscriber substation D in the distant exchange 101 may be extended in an identical manner. Specifically, the subscriber at the calling first party subscriber substation A initiates the call, dials the prefix digit 2, and then dials the three digits comprising the directory number of the called subscriber substation D; whereby the link 25 illustrated, the trunk circuit 90' and the automatic switching apparatus 105 may be utilized to complete the established connection; all in the manner previously explained. In this case the party relay R120 in the selector 27 is operated as a consequence of the closing of the set of switch springs S111 incorporated in the dial at the calling first party subscriber substation A incident to dialing the prefix digit 2; whereby the transfer relay R150 is operated and retained in its operated position. The operated transfer relay R150 substitutes, at the contacts 151 and 152, the booster battery BA40 for the booster battery BB20 as previously explained. Accordingly, when the call is subsequently answered at the called private subscriber substation D in the distant exchange 101, the answer relay R170 in the selector 27 operates in order to initiate operation of the impulser 60 in the event it is not operating at this time. The impulser 60 effects operation of the pick-up relay R160 and the subsequent operation of the meter relay R140 twice in succession, as well as operation of the timing switch 90; all in the manner previously explained. In the present example, each time the meter relay R140 operates, it completes, at the contacts 141, a path, including the contacts 152 and 136, for connecting the booster battery BA40 to the control wiper 8 of the finder 26. Accordingly, each time the meter relay R140 operates and then restores, both of the magnets MA and MB respectively associated with the two meters in the line circuit 17 respectively associated with the two party subscriber substations A and B are operated. Thus, in the present example, both of the meters mentioned are operated twice in succession initially and are operated twice in succession at the expiration of each 100 seconds or base time interval thereafter. This result is brought about by virtue of the fact that the booster battery BA40 has a normal voltage of 40 volts, whereas the booster battery BB20 has a normal voltage of 20 volts so that each time the 40 volts booster battery potential is connected to the control wiper 8 of the finder 26, both of the magnets MA and MB operate, the magnet MA being of the marginal type as previously explained.

The subsequent release of this established connection between the calling party subscriber substation A in the central exchange 100 and the called private subscriber substation D in the distant exchange 101 is the same as that previously described. Also it will be understood that the metering from the calling first party subscriber substation A to called private subscriber substations in two exchanges respectively disposed in the first and third zones of the telephone system are the same as previously explained.

Reconsidering the over-all operation of the meter magnets MA and MB of the respective meters respectively associated with the party subscriber substations A and B on the party subscriber line 1, it will be observed that while the impulser or impulse generator 60 is operating the matching relay R180 is operated intermittently. In fact, the matching relay R180 is operated three times successively by the set of switch springs SZ63 under the control of the third zone cam CZ63 upon each revolution of the operating shaft of the impulser 60 driven by the motor M61. Since the operating shaft mentioned is rotated by the motor M61 one revolution every ten seconds, the matching relay R180 is operated thirty times each 100 seconds or base time interval. Each time the matching relay R180 operates, it completes, at the contacts 181, a path for connecting the negative terminal of the exchange battery EB48 to the lower terminal of the magnet MB, as well as multiple paths for connecting the negative terminal of the exchange battery EB48 to the corresponding terminals of the other meters both in the party subscriber line circuits and in the private subscriber line circuits in the associated group. However, the connection of the negative terminal of the exchange battery EB48 to the lower terminal of the magnet MB is without effect unless, of course, the party subscriber line 1 is connected to a link, such for example, as the link 25 illustrated. In the last mentioned case, the cut-off relay R10 in the line circuit 17 individual to the party subscriber line 1 occupies its operated position completing, at the contacts 13, the previously traced path for connecting the upper terminal of the magnet MA to the control conductor C4 of the party subscriber line 1 and consequently to the control wiper 8 of the finder 26, which control wiper 8 of the finder 26 has ground or positive exchange battery potential normally connected thereto as previously explained. Accordingly, in the event the party subscriber line 1 is connected to the link 25, the magnets MA and MB are energized in series circuit relation from the exchange battery EB48 each time the matching relay R180 operates. However, neither of the magnets MA or MB is operated by virtue of the low voltage, 48 volts, of the exchange battery EB48 and the high series resistance of the windings of the magnets MA and MB.

Subsequently, however, when the meter relay R140 in the selector 27 is operated, the positive terminal of either the booster battery BA40 or the positive terminal of the booster battery BB20 is connected to the control conductor of the link 25 as ground potential is removed therefrom, depending upon whether the party subscriber substation A or B is respectively the calling party subscriber substation involved in the established connection; all as previously explained. When the positive terminal of the booster battery BB20 is thus connected to the control wiper 8 of the finder 26 and consequently to the upper terminal of the magnet MA and matched against the negative terminal of the exchange battery EB48, a total voltage of 68 volts is impressed across the series connected magnets MA and MB; whereby the magnet MB operates but the magnet MA does not operate. On the other hand, when the positive terminal of the booster battery BA40 is connected to the upper terminal of the magnet MA and matched against the negative terminal of the exchange battery EB48, a total voltage of 88 volts is impressed across the series connected magnets MA and MB, causing both of them to operate. This matching arrangement is very advantageous as it prevents undue current drains from the exchange battery EB48 during the time interval that the party subscriber line 1 is busy but is not being metered by the associated link 25. Also the arrangement wherein the matching described above is brought about directly in the coils of the magnets of the two meters greatly minimizes the required apparatus eliminating control relays.

In view of the foregoing it will be understood that the extension of local and trunk calls from a calling private subscriber substation on a private subscriber line in the group, including the party subscriber line 1, via the link 25 illustrated are the same as described in conjunction with the second party subscriber substation B on the party subscriber line 1. This result follows since the private subscriber substation mentioned comprises, like the second party subscriber substation B, a conventional dial so that the party relay R120 and the transfer relay R150 in the selector 27 of the link 25 are not operated incident to the extension of the local or trunk calls therefrom. Of course, in this example, the line circuit associated with the private subscriber line mentioned comprises only one meter having a magnet which is operative when the exchange battery EB48 is connected under the control of the matching relay R180 to one terminal thereof and when the booster battery BB20 is connected under the control of the meter relay R140 to the other terminal thereof. Accordingly, the meter in the line circuit associated with each private subscriber line reads directly the service rendered to the connected private subscriber substation.

In view of the foregoing explanation of the mode of operation of the telephone system, it will be understood that zone metering is carried out on a unit call basis depending upon the zone of the distant exchange of the called subscriber substation with respect to the central exchange 100 and of course upon the time duration of the established connections since the meters are operated initially a short time after a trunk connection is established and thereafter at the expiration of each additional 100 seconds or base time interval. Also it will be observed that the reading of the meter individually associated with a first party subscriber substation or a party subscriber line may be taken directly as a measure of service rendered thereto; however, the meter reading of the meter individually associatd with the second party subscriber substation on a party subscriber line must be corrected in order to obtain a measure of the service rendered thereto by subtracting therefrom the meter reading of the meter individually associated with the first party subscriber substation on the party subscriber line. This result follows from the circumstance that the meter individually associated with the second party subscriber substation on the party subscriber line is falsely operated each time the meter individually associated with the first party subscriber substation on the party subscriber line is properly operated. While this scheme necessitates a minor calculation in order to obtain a measure of the service rendered to each second party subscriber substation on a party subscriber line, the circuit arrangement is greatly simplified permitting the utilization of a conventional finder of the Strowger type in each finder-selector link and eliminating the usual meter-selecting switch normally disposed in the line circuit associated with each party subscriber line.

In view of the foregoing, it is apparent that there has been provided a telephone system comprising party lines of the two party subscriber substation type and improved zone metering facility; whereby the services rendered to the respective party subscriber substations on a party subscriber line may be respectively metered on a unit call basis depending upon the zones of the called exchanges with reference to the zone of the calling exchange, as well as to the time duration of the established connections.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including a party line having first and second stations thereon, a first meter individual to said first station, a second meter common to said first and second stations, automatic switching apparatus, and means controlled from either calling one of said stations on said party line for operating said switching apparatus to extend a connection therefrom; a first source of potential, a second source of potential, means included in said switching apparatus for identifying the calling one of said stations, means governed by said identifying means for selecting said first source of potential incident to the identification of said first station as the calling station and for selecting said second source of potential incident to the identification of said second station as the calling station, and means including said selected first source of potential for operating both said first and second meters and including said selected second source of potential for operating only said second meter so that said first meter is operated to measure service rendered only to said first station and said second meter is operated to measure service rendered to both said first and second stations.

2. In a telephone system including a party line having first and second stations thereon, a first meter individual to said first station, a second meter common to said first and second stations, automatic switching apparatus, and means controlled from either calling one of said stations on said party line for operating said switching apparatus to extend a call therefrom; a first source of potential, a second source of potential, means included in said switching apparatus for identifying the calling one of said stations, means governed by said identifying means for selecting said first source of potential incident to the identification of said first station as the calling station and for selecting said second source of potential incident to the identification of said second station as the calling station, and means responsive to answering of said call for operating both said first and second meters if said first source of potential is selected and for operating only said second meter if said second source of potential is selected so that said first meter is operated to measure service rendered only to said first station and said second meter is operated to measure service rendered both to said first and second stations.

3. In a telephone system including a party line having first and second stations thereon, a first meter individual to said first station, a second meter common to said first and second stations, automatic switching apparatus, and means controlled from either calling one of said stations on said party line for operating said switching apparatus to extend a call therefrom; a first source of potential, a second source of potential, means included in said switching apparatus for identifying the calling one of said stations, means governed by said identifying means for selecting said first source of potential incident to the identification of said first station as the calling station and for selecting said second source of potential incident to the identification of said second station as the calling station, and means selectively controlled in accordance with the extent of said connection for selectively operating a corresponding number of times said first and second meters in series with said selected first source of potential and for selectively operating a corresponding number of times said second meter in series with said selected second source of potential so that said first meter is operated to measure service rendered only to said first station and said second meter is operated to measure service rendered both to said first and second stations.

4. In a telephone system including a party line having first and second stations thereon, a first meter individual to said first station, a second meter common to said first and second stations, automatic switching apparatus, and means controlled from either calling one of said stations on said party line for operating said switching apparatus to extend a call therefrom; a first source of potential, a second source of potential, means included in said switching apparatus for identifying the calling one of said stations, means governed by said identifying means for selecting said first source of potential incident to the identification of said first station as the calling station and for selecting said second source of potential incident to the identification of said second station as the calling station, means responsive to the answering of said call for operating both said first and second meters in series with said selected first source of potential and for operating only said second meter in series with said selected second source of potential, and timing means controlled a fixed time interval after answering of said call for reoperating said first and second meters or only said second meter in accordance respectively with the selected first source of potential or the selected second source of potential so that said first meter is operated to measure service rendered only to said first station and second meter is operated to measure service rendered both to said first and second stations.

5. In a telephone system including a party line having first and second stations thereon, a first meter individual to said first station, a second meter common to said first and second stations, automatic switching apparatus, and means controlled from either calling one of said stations on said party line for operating said switching apparatus to extend a call therefrom; a first source of potential, a second source of potential, means included in said switching apparatus for identifying the calling one of said stations, means governed by said identifying means for selecting said first source of potential incident to the identification of said first station as a calling station and for selecting said second source of potential incidental to the identification of said second station as the calling station, means selectively controlled in accordance with the extent of said call for selecting a corresponding number of times that the first and second meters or only said second meter is to be operated answering means operated responsive to answering of said call, means controlled by operation of said answering means for operating said first and second meters in series with said selected first source of potential said selected number of times or for operating only said second meter in series with said selected second source of potential said selected number of times, and timing means controlled a fixed time interval after operation of said answering means for reoperating said first and second meters or only said second meter said selected number of times in series respectively with said selected first source of potential or said selected second source of potential so that said meter is operated to measure service rendered only to said first station and said second meter is operated to measure service rendered both to said first and second stations.

6. In a telephone system including a party line having first and second stations thereon, a first meter individual to said first station, a second meter common to said first and second stations, automatic switching apparatus, and means controllable from either calling one of said stations on said party line for operating said switching apparatus to extend a connection therefrom; said switching apparatus including a high voltage source of booster battery and a low voltage source of booster battery, means included in said switching apparatus for identifying the one of said stations from which said connections is extended, means governed by said identifying means and controlled in the event said first station is identified as the calling station for selecting said high voltage source of booster battery and controlled in the event said second station is identified as the calling station for selecting said low voltage source of booster battery, and means including said selected source of booster battery for selectively operating said first and second meters.

7. In a telephone system including a party line having first and second stations thereon, a first meter individual to said first station, a second meter common to said first and second stations, automatic switching apparatus, and means controllable from either calling one of said stations on said party line for operating said switching apparatus to extend a connection therefrom; said switching apparatus including a high voltage source of booster battery and a low voltage source of booster battery, means included in said switching apparatus for identifying the one of said stations from which connection is extended, means governed by said identifying means and controlled in the event said first station is identified as the calling station for selecting said high voltage source of booster battery and controlled in the event said second station is identified as the calling station for selecting said low voltage source of booster battery, said first meter being of the marginal type, and means for connecting said selected one of said sources of booster battery to said meters so that both said first and second meters are operated when said high voltage source of booster battery is connected thereto and only said second meter is operated when said low voltage source of booster battery is connected thereto so that said first meter is operated to measure service rendered only to said first station and said second meter is operated to measure service rendered both to said first and second stations.

8. In a telephone system including a party line having first and second stations thereon, a first meter individual to said first station, a second meter common to said first and second stations, automatic switching apparatus, and means controllable from either calling one of said stations on said party line for operating said switching apparatus to extend a connection therefrom; said first and second meters being connected in series circuit relation, said first meter being of the marginal type, a high voltage source, a low voltage source, means included in said switching apparatus for identifying the one of said stations from which said connection is extended, means governed by said identifying means and controlled in the event said first station is identified as the calling station for selecting said high voltage source and controlled in the event second station is identified as the calling station for selecting said low voltage source, and means for connecting said selected high voltage source or said selected low voltage source to said series circuit so that both said first and second meters are operated when said high voltage source is connected to said series circuit and only said second meter is operated when said low voltage source is connected to said series circuit so that said first meter is operated to measure service rendered only to said first station and said second meter is operated to measure service rendered both to said first and second stations.

9. In a telephone system including a party line having first and second stations thereon, a line circuit associated with said party line and provided with a cut-off relay and a first meter individual to said first station and a second meter common to said first and second stations, an automatic switching link, and means controllable from either calling one of said stations on said party line for connecting said line circuit to said link and then for operating said link to extend a connection therefrom; a control conductor included in said connection between said line circuit and said link, means responsive to the connection of said line circuit to said link for operating said cut-off relay and for retaining said cut-off relay operated over said control conductor, a first source of potential, a second source of potential, means included in said link for identifying the calling one of said stations from which said connection is extended, means governed by said identifying means for selecting said first source of potential incident to the identification of said first station as the calling station and for selecting said second source of potential incident to the identification of said second station as the calling station, answering means operated responsive to the answering of said connection, means controlled by operation of said answering means for operating both said first and second meters in series with said control conductor and said selected first source of potential or for operating only said second meter in series with said first meter and said control conductor and said selected second source of potential so that said first meter is operated to measure service rendered only to said first station and second meter is operated to measure service rendered both to said first and second stations.

10. In a telephone system including a party line having first and second stations thereon, a line circuit associated with said party line and provided with a cut-off relay and a first meter individual to said first station and a second meter common to said first and second stations, an automatic switching link provided with a switching relay, and means controllable from either calling one of said stations on said party line for connecting said line circuit to said link and then for operating said link to extend a connection therefrom; said connection between said line circuit and said link including a control conductor, means responsive to the connection of said line circuit to said link for operating said cut-off relay and for retaining said cut-off relay operated over said control conductor, means responsive to the operation of said link to extend said connection for operating said switching relay and for retaining said switching relay operated over said control conductor, a high voltage source, a low voltage source, means included in said link for interrupting said control conductor between said cut-off relay and said switching relay and for selectively connecting said high voltage source and said low voltage source to the section of said control conductor extending to said cut-off relay, and means selectively controlled by the connection of said high voltage source and said low source to said last-mentioned section of said control conductor for selectively operating said meters.

11. In a telephone system including a subscriber line, an automatic switching link, and means controllable over said line for seizing said link and for operating it to extend a call therefrom; first and second conductors, an impulse generator, means controlled by said impulse generator for intermittently transmitting impulses over said first conductor, means included in said link and governed in accordance with the extent of said call for selecting a corresponding number of impulses to be transmitted over said second conductor, answering means included in said link operated responsive to answering of said call, means controlled by operation of said answering means for transmitting said selected number of impulses over said second conductor, timing means included in said link and governed a predetermined time interval after operation of said answering means for transmitting said selected number of impulses over said second conductor, and a meter individual to said line connected in series with said first and second conductors and operated only incident to the simultaneous transmission of impulses over said first and second conductors.

12. In a telephone system including a subscriber line, an automatic switching link, and means controllable over said line for seizing said link and for operating it to extend a connection therefrom; first and second conductors, an impulse generator operative to transmit periodic impulses, first relay means operated responsive to each impulse transmitted by said impulse generator, means controlled by operation of said first relay means for transmitting an impulse over said first conductor, said link including a timer having a fixed number of positions, means operated responsive to impulses transmitted by said impulse generator, means controlled by operation of said last-mentioned means for advancing said timer cyclically through a given one of its positions, second relay means included in said link and operated responsive to operation of said timer through its given one position, means controlled by operation of said second relay means for transmitting an impulse over said second conductor, and a meter individual to said line connected in series with said first and second conductors and operated only incident to the simultaneous transmission of impulses over said first and second conductors.

13. In a telephone system including a subscriber line, a meter individual to said line, an automatic switching link, and means controllable over said line for seizing said link and for operating it to extend a connection therefrom; first and second control conductors, first and second metering conductors, means included in said link and controlled in accordance with the extent of said connection extended thereby for selecting a corresponding one of said metering conductors, an impulse generator operative to apply N impulses per base time interval to said first metering conductor and to apply AN impulses per base time interval to said second metering conductor and to said first control conductor, said link including a timer and means controlled by said impulse generator for operating said timer and means controlled by operation of said timer for connecting once during said base time interval said selected one of said metering conductors to said second control conductor in order to cause one or A impulses to be applied to said second control conductor, and matching means responsive to the simultaneous transmission of impulses over said first and second control conductors for operating said meter.

14. In a telephone system including a subscriber line, a meter individual to said line, an automatic switching link, and means controllable over said line for seizing said link and for operating it to extend a connection therefrom; an impulse generator, means controlled by said impulse generator for connecting intermittently a first potential to a first terminal of said meter, and means included in said link for selectively connecting a second potential to a second terminal of said meter, said meter being operated only when said first and second potentials are simultaneously respectively connected to the first and second terminals thereof.

15. In a telephone system including a subscriber line, a meter individual to said line, an automatic switching link, and means controllable over said line for seizing said link and for operating it to extend a connection therefrom; said link including a control conductor, means operated responsive to seizure of said link, means controlled incident to the operation of said seizure means for connecting a first terminal of said meter to said control conductor, means operated responsive to operation of said link to extend said connection, means controlled by operation of said last-mentioned means for connecting a reference potential to said control conductor in order to retain operated said link, an impulse generator, means controlled by said impulse generator for connecting intermittently a negative potential to the second terminal of said meter so that said meter is intermittently energized but not operated, and means included in said link for selectively disconnecting said reference potential from said control conductor and for connecting a positive potential thereto, said meter being operated only when said positive and negative potentials are simultaneously respectively connected to the first and second terminals thereof.

16. In a telephone system including a plurality of subscriber lines, a plurality of meters individual to said lines, a plurality of automatic switching links, and means controllable over said lines for seizing said links and for operating them to extend connections therefrom; an impulse generator, means controlled by said impulse generator for connecting intermittently a first potential to a first terminal of each of said meters, and means included in each of said links for selectively connecting a second potential to a second terminal of the meter individual to the connected line, each of said meters being operated only when said first and second potentials are simultaneously respectively connected to the first and second terminals thereof.

17. In a telephone system including a party line having first and second stations thereon, a first meter individual to said first station, a second meter common to said first and second stations, an automatic switching link, and means controllable from either calling one of said stations on said party line for seizing said link and for operating it to extend a connection therefrom; a source of first potential, a source of second potential, a source of third potential, first and second conductors, an impulse generator, means controlled by said impulse generator for intermittently transmitting impulses from said source of first potential over said first conductor, means included in said link for identifying the calling one of said stations on said line and for selecting said source of second potential in the event said first station is identified and for selecting said source of third potential in the event said second station is identified, means included in said link for selectively transmitting impulses from said selected source of potential over said second conductor, and matching means selectively responsive to the simultaneous transmission of an impulse from said source of first potential over said first conductor and of an impulse from said source of second potential over said second conductor and to the simultaneous transmission of an impulse from said source of first potential over said first conductor and of an impulse from said source of third potential over said second conductor for selectively operating said first and second meters.

CLARENCE E. LOMAX.

REFERENCES CITED

The following references are of record in the file of this patent:

UNITED STATES PATENTS

| Number | Name | Date |
|---|---|---|
| 1,799,223 | Fowler | Apr. 7, 1931 |
| 1,858,863 | Ostline | May 17, 1932 |
| 2,089,438 | Scudder | Aug. 10, 1937 |
| 2,225,386 | Hebel | Dec. 17, 1940 |
| 2,250,735 | Topfer | July 29, 1941 |
| 2,282,975 | Lurke et al. | May 12, 1942 |
| 2,314,961 | Williams | Mar. 30, 1943 |
| 2,322,330 | Vroom | June 22, 1943 |
| 2,428,376 | Matthies | Oct. 7, 1947 |
| 2,468,429 | Dehm et al. | Apr. 26, 1949 |